United States Patent
Anasta

(10) Patent No.: US 12,013,965 B2
(45) Date of Patent: Jun. 18, 2024

(54) CONTROLLING A SCREENSHOT FUNCTION TO OBFUSCATE SENSITIVE INFORMATION IN A SCREENSHOT

(71) Applicant: Capital One Services, LLC, McLean, VA (US)

(72) Inventor: Jude Pierre Anasta, Hudson, NY (US)

(73) Assignee: Capital One Services, LLC, McLean, VA (US)

(*) Notice: Subject to any disclaimer, the term of this patent is extended or adjusted under 35 U.S.C. 154(b) by 185 days.

(21) Appl. No.: 17/448,459

(22) Filed: Sep. 22, 2021

(65) Prior Publication Data

US 2023/0087884 A1  Mar. 23, 2023

(51) Int. Cl.
*H04L 29/06* (2006.01)
*G06F 9/451* (2018.01)
*G06F 21/31* (2013.01)
*G06F 21/44* (2013.01)
(Continued)

(52) U.S. Cl.
CPC .......... *G06F 21/6245* (2013.01); *G06F 9/451* (2018.02); *G06F 21/31* (2013.01); *G06F 21/44* (2013.01); *G06F 21/57* (2013.01); *G06F 21/629* (2013.01); *G06F 2221/032* (2013.01);
(Continued)

(58) Field of Classification Search
CPC .................................. G06F 21/62; G06F 21/60
See application file for complete search history.

(56) References Cited

U.S. PATENT DOCUMENTS

| | | |
|---|---|---|
| 8,666,110 B2 | 3/2014 | Yoo et al. |
| 8,935,807 B2 * | 1/2015 | Sinha ............... G06F 21/62 726/28 |
| 9,423,901 B2 | 8/2016 | Bustamante |

(Continued)

FOREIGN PATENT DOCUMENTS

| | | |
|---|---|---|
| EP | 3484164 A1 | 5/2019 |
| EP | 3123705 B1 | 5/2020 |

OTHER PUBLICATIONS

Charlie Noon, "What Is Discord Streamer Mode And How It Protects YourStream," Website: https://www.wepc.com, Jul. 20, 2021, 9 Pages.

(Continued)

*Primary Examiner* — Jason K Gee
(74) *Attorney, Agent, or Firm* — Harrity & Harrity, LLP

(57) ABSTRACT

In some implementations, a device may monitor a screenshot function of a user device. The device may receive, via an application, sensitive information associated with an operation of the application. The device may detect a screenshot instruction associated with the screenshot function capturing a screenshot of a graphical user interface of the application that is displaying the sensitive information. The device may control the screenshot function to suspend a capture of the screenshot of the graphical user interface. The device may identify a portion of the graphical user interface that includes the sensitive information. The device may mask portion of the graphical user interface to obfuscate the sensitive information. The device may enable the screenshot function to capture, according to the screenshot instruction, the screenshot with obfuscated sensitive information. The device may unmask the portion to enable the sensitive information to be displayed via the graphical user interface.

20 Claims, 8 Drawing Sheets

(51) Int. Cl.
  *G06F 21/57*   (2013.01)
  *G06F 21/62*   (2013.01)
(52) U.S. Cl.
  CPC ............... *G06F 2221/2137* (2013.01); *G06F 2221/2141* (2013.01)

(56) References Cited

U.S. PATENT DOCUMENTS

| | | |
|---|---|---|
| 9,898,619 B1 | 2/2018 | Hadsall |
| 11,006,077 B1 | 5/2021 | Truong et al. |
| 2015/0302621 A1 | 10/2015 | Liu et al. |
| 2016/0210473 A1* | 7/2016 | Cohen ................. G06F 21/6245 |
| 2021/0142121 A1* | 5/2021 | Sivakumar ............. G06V 20/54 |
| 2021/0200886 A1* | 7/2021 | Ramamurthy ........ G06F 21/629 |

OTHER PUBLICATIONS

Liam Tung, "Google Chrome will now hide embarrassing notifications when you are sharing your screen," Website: https://www.zdnet.com/article/screen-sharing-now-google-chrome-will-hide-your-embarrassing-notifications/, Jan. 26, 2021, 5 Pages.

Veronica Garcia, "This web extension protects your sensitive information while screensharing," The American Genius, Website: https://theamericangenius.com/tech-news/this-web-extension-protects-your-sensitive-information-while-screensharing/, Jun. 23, 2021, 10 Pages.

Brian Burkett, "Muzzle—silence embarrassing notifications," Website: https://muzzleapp.com, 2020, 2 Pages.

* cited by examiner

CONTROLLING A SCREENSHOT FUNCTION TO OBFUSCATE SENSITIVE INFORMATION IN A SCREENSHOT

BACKGROUND

A screenshot is an image captured from a display of a device (e.g., a user device, such as a computer and/or a smartphone). The screenshot may be captured via an operating system and/or an application that is installed on the device. In some cases, the screenshot may be captured as part of a screen recording of activity or content that is presented on the display of the device.

SUMMARY

Some implementations described herein relate to a system for obfuscating sensitive information in a screenshot. The system may include one or more memories and one or more processors communicatively coupled to the one or more memories. The system may be configured to receive an authorization to control a screenshot function of a user device. The system may be configured to receive a screenshot instruction associated with capturing a screenshot of a display of the user device. The system may be configured to control, based on the authorization, the screenshot function to suspend a capture of the screenshot for a time period. The system may be configured to identify a portion of a graphical user interface of the user device that includes sensitive information. The system may be configured to mask, before an expiration of the time period, the portion of the graphical user interface to form a masked portion that obfuscates the sensitive information on the graphical user interface. The system may be configured to enable, after the masked portion is formed, the screenshot function to capture, according to the screenshot instruction, the screenshot. The system may be configured to unmask, after the expiration of the time period, the masked portion to enable the sensitive information to be displayed via the portion of the graphical user interface.

Some implementations described herein relate to a non-transitory computer-readable medium that stores a set of instructions for a user device. The set of instructions, when executed by one or more processors of the user device, may cause the user device to receive an authorization to control a screenshot function of the user device. The set of instructions, when executed by one or more processors of the user device, may cause the user device to receive content within a field of a graphical user interface. The set of instructions, when executed by one or more processors of the user device, may cause the user device to receive a screenshot instruction associated with capturing a screenshot of a display of the user device. The set of instructions, when executed by one or more processors of the user device, may cause the user device to prevent, based on the field being designated as being associated with the sensitive information, a screenshot function of the user device from capturing the screenshot until the content is masked. The set of instructions, when executed by one or more processors of the user device, may cause the user device to determine that the content is masked. The set of instructions, when executed by one or more processors of the user device, may cause the user device to enable the screenshot function to capture, according to the screenshot instruction, the screenshot with the content being masked on the display.

Some implementations described herein relate to a method for obfuscating sensitive information. The method may include monitoring, by a device, a screenshot function of a user device. The method may include receiving, by the device and via an application, sensitive information associated with an operation of the application. The method may include detecting, by the device, a screenshot instruction associated with the screenshot function capturing a screenshot of a graphical user interface of the application that is displaying the sensitive information. The method may include controlling the screenshot function to suspend a capture of the screenshot of the graphical user interface for a time period. The method may include identifying, by the device, a portion of the graphical user interface that includes the sensitive information. The method may include masking, by the device and before an expiration of the time period, the portion of the graphical user interface to obfuscate the sensitive information. The method may include enabling, after the portion of the graphical user interface is masked, the screenshot function to capture, according to the screenshot instruction, the screenshot with obfuscated sensitive information. The method may include unmasking, after the expiration of the time period, the portion to enable the sensitive information to be displayed via the graphical user interface.

DETAILED DESCRIPTION

Figure 1A:
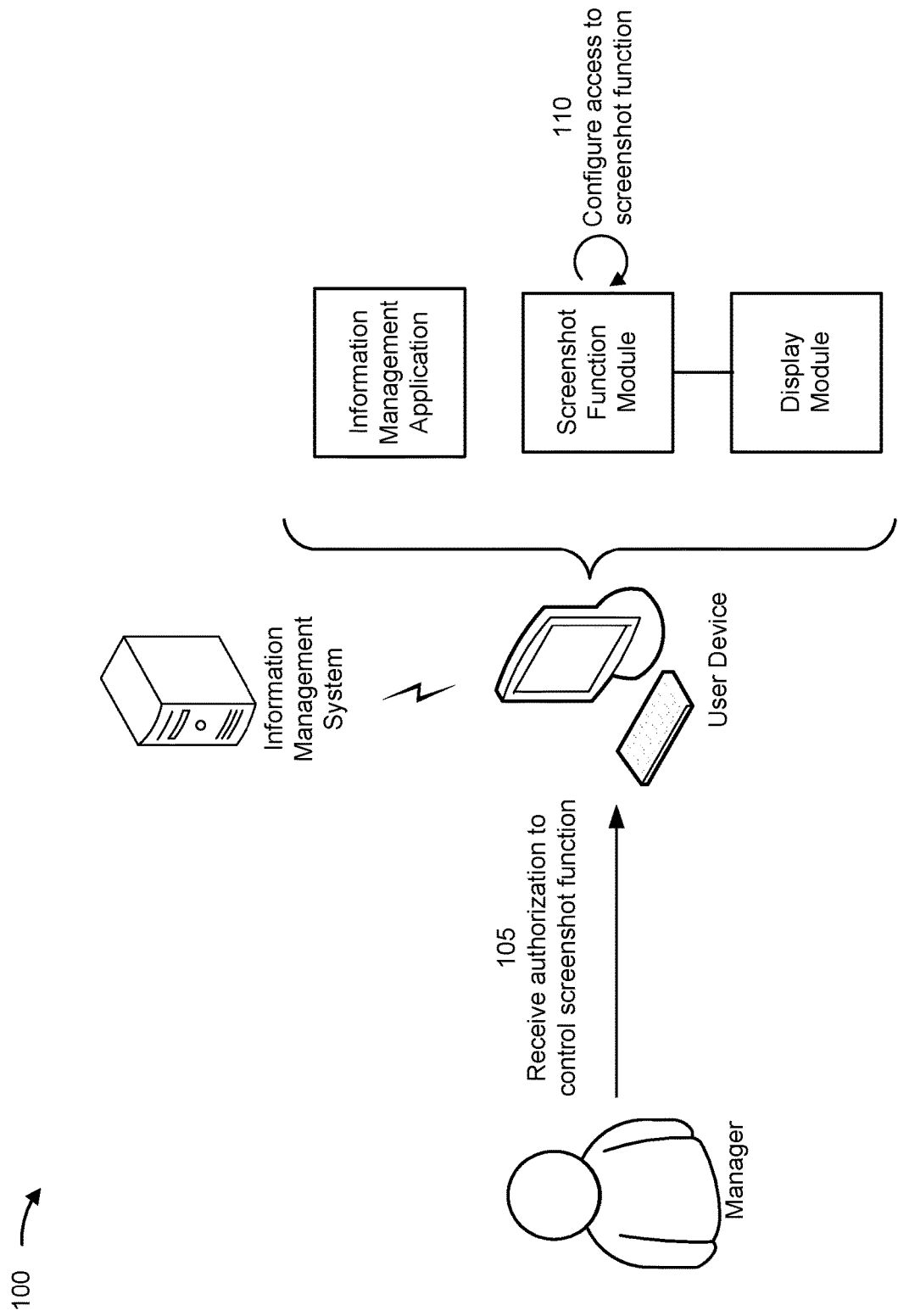
FIGS. 1A-1E are diagrams of an example implementation associated with controlling a screenshot function to obfuscate sensitive information in a screenshot.

The following detailed description of example implementations refers to the accompanying drawings. The same reference numbers in different drawings may identify the same or similar elements.

In some cases, a user may access and/or utilize an application or system that is configured to manage information associated with individuals. For example, the user may be a representative of an enterprise that uses an information management system to store and/or maintain information associated with a customer of the enterprise (e.g., in association with a customer account). In some instances, such an information management system may store sensitive information associated with the customer. The sensitive information may include personal information (e.g., identification information and/or contact information), confidential information (e.g., customer-related information associated with interactions involving the customer and the enterprise), security-related information (e.g., authentication information to authenticate the customer), or other types of non-public information.

In order to secure the sensitive information and prevent fraud involving the sensitive information, the information management system may utilize certain security protocols in an attempt to prevent the sensitive information from being intercepted via fraudulent acts. For example, the information management system and/or information within the information management system may be secured using one or more encryption techniques. However, such protocols may not prevent unauthorized access or copying of the sensitive information using a screenshot function (or other type of screen capture, including screen recording). For example, if sensitive information is displayed on a display of a user device, the sensitive information may be captured within a screenshot (e.g., via an instruction from a user of the user device or an instruction from another application). In such a case, the sensitive information within the screenshot can be used to commit fraud or another type of malicious activity (e.g., unauthorized access to the customer account, identity theft, invasion of privacy, among other examples). However, in some instances, other information presented on the display may not be sensitive and/or may provide uses that do not involve fraud and/or malicious activity.

Some implementations described herein provide a system that, when a display is presenting sensitive information, obfuscates sensitive information prior to screenshot of the display being captured. The system may include and/or be associated with a user device, an information management application, and/or an information management system. In some implementations, the information management application may be installed on the user device and authorized or configured to control a screenshot function of the user device to ensure that sensitive information being presented on a display appears obfuscated within a captured screenshot and/or is not within the captured screenshot. For example, when a screenshot instruction is received (or detected), portions of a graphical user interface that include the sensitive information may be masked prior to the screenshot being captured according to the screenshot instruction.

As described herein, the system may be authorized to control a screenshot function of the user device to enable the sensitive information to be masked. Accordingly, the system and/or user device may quickly and efficiently identify sensitive information and facilitate capture of a screenshot that includes masked portions associated with the sensitive information (e.g., over or in place of the sensitive information), thereby reducing delay or degrading the user experience involving the delay (e.g., relative to systems that fully deactivate screenshot functions). Moreover, the system and/or the user device provide increased security of sensitive information by preventing screenshots from including sensitive information, thereby reducing opportunities for fraud relative to other systems that do not mask or obfuscate sensitive information, as described herein.

In this way, a user may obtain a screenshot of non-sensitive information that is being displayed, but the screenshot will not include sensitive information (because it is obfuscated or masked, as described herein), thereby preventing exposure of the sensitive information that can result in a breach of security and/or fraudulent activity involving the sensitive information. Accordingly, relative to other systems that do not account for screen capture technology (e.g., screenshot capture and/or screen recording), the system and methods described herein provide improved security of sensitive information associated with individuals and/or sensitive information that is managed by an information management system.

FIGS. 1A-1E are diagrams of an example implementation 100 associated with controlling a screenshot function to obfuscate sensitive information in a screenshot. As shown in FIGS. 1A-1E, example implementation 100 includes a user device, an information management system, and a management device. These devices are described in more detail below in connection with FIG. 2 and FIG. 3.

The information management system may be associated with an enterprise or other type of entity that maintains information associated with one or more individuals (e.g., one or more customers of the enterprise, one or more employees of the enterprise, or the like). The user device may include an information management application, a screenshot function module, and/or a display module. The information management application may be an application that is associated with the information management system and/or that is configured to enable the user to access, via the user device, information that is managed by the information management system. The screenshot function module of the user device is configured to control a screenshot function of the user device. For example, the screenshot function module may be associated with an operating system of the user device and/or a screenshot application of the user device. The screenshot function module may be configured to capture a screenshot on a display of the user device based on receiving a screenshot instruction (e.g., via a user input or an instruction from another application of the user device). The screenshot function module may capture the screenshot based on an output of the display module, which may be configured to render an image on a display of the user device.

As shown or described in connection with FIGS. 1A-1E, an administrator may be associated with the user device, the information management system, and/or the management device to facilitate control of a screenshot function as described herein. A user of the user device may be an individual that has access to the user device, the information management system, and/or information that is managed by the information management system. For example, the user may be an employee of an enterprise associated with the user device and/or the information management system, an authorized user of the user device, and/or any other individual that has gained access to the user device and/or the information management system.

As shown in FIG. 1A, and by reference number 105, the user device receives authorization to control a screenshot function. For example, as shown, the administrator may provide authorization from the user device and/or the information management application to access the screenshot function module of the user device. More specifically, the administrator may authorize the user device and/or the information management system to override operations of the screenshot function module, such as screenshot capture operations, screenshot storage operations, and/or screenshot transmission operations, among other examples.

The user device may receive the authorization to control the screenshot function based on the information management system being installed on the user device. For example, the authorization may be received via the administrator indicating (e.g., via an acceptance of a terms of service agreement of the information management application) that the information management application is authorized to control the screenshot function module. In some implementations, the administrator may indicate, within the authorization, access constraints associated with enabling access to the screenshot function. For example, the authorization may indicate that the information management application may access the screenshot function under one or more conditions (e.g., while the information management application is running, during a session of the information management application, while a graphical user interface of the information management application is being presented on a display of the user device, and so on).

As further shown in FIG. 1A, and by reference number 110, the user device configures access to the screenshot function module. For example, the user device may configure the information management application to monitor the screenshot function module in order to detect one or more operations of the screenshot function module (e.g., an operation involving capture of screenshot capture, an operation involving a save of screenshot, and/or an operation involving a communication including a screenshot, among other examples), and/or interactions with the screenshot function module (e.g., a user interaction involving a screenshot instruction and/or an application interaction involving a screenshot instruction).

In some implementations, the user device may configure the information management application to access the screenshot function according to the authorization that is provided by the administrator. The user device may configure the information management application to access the screenshot function module only when the information management application is executing on the user device. Additionally, or alternatively, the user device may configure the information management application to have access to the screenshot function module only during an active session of the information management application (e.g., during active user interaction with the information management application) and/or within a threshold time period of an active session. The user device may configure the information management application to have access to the screenshot function module only while a graphical user interface of the information management application is being presented on a display of the user device.

In this way, the user device may abide by certain privacy requirements and/or administrative requirements associated with controlling a screenshot function, as described herein. Furthermore, the user device may conserve resources that would otherwise be consumed through continuously accessing or monitoring the screenshot function module in accordance with one or more examples described herein.

Figure 1B:
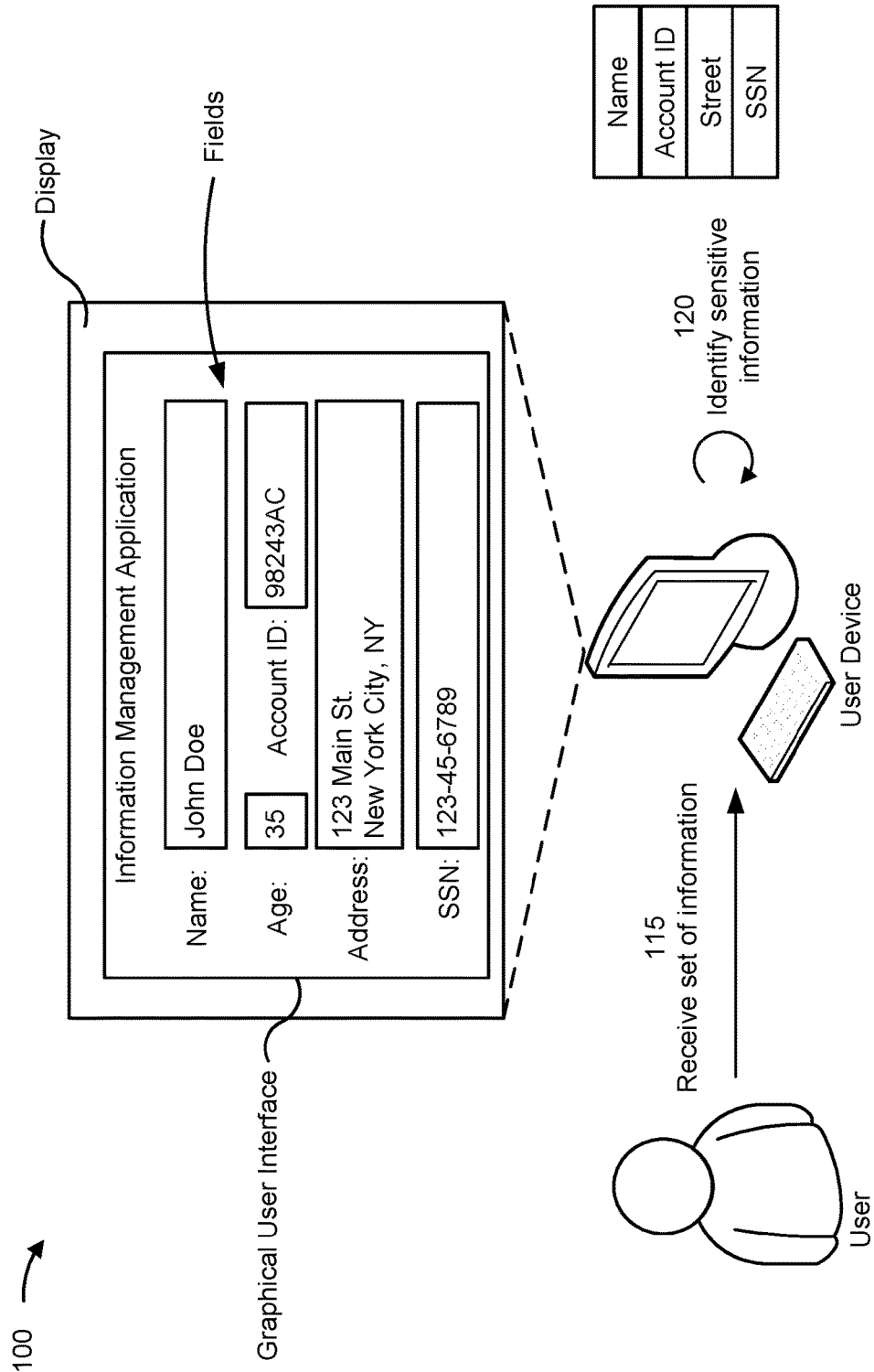

As shown in FIG. 1B, and by reference number 115, the user device receives a set of information. For example, a user may engage in a session associated with the information management application to access an account that is managed by the information management system. More specifically, the user may provide a user input (e.g., a query of a search for information) to the session to access information associated with the account. Accordingly, the user device may receive the set of information based on accessing the account via the information management application and/or information management system. In such a case, the set of information may be associated with the account and/or an individual that is associated with the account.

The set of information may include sensitive information associated with the individual (e.g., a customer of the enterprise) that is associated with the account. The sensitive information may include personal information associated with the individual, such as a name, an address, a numerical identifier (e.g., a social security number), contact information, or other types of personal information. Additionally, or alternatively, the sensitive information may include confidential information, such as a transaction history involving transactions associated with the individual and the enterprise, a service history involving services received by the individual, or other types of information that is to be kept confidential between the enterprise and the customer. The sensitive information may include security information, such as a username, password, or other type of credential that can be used to secure the account and/or authenticate the individual. Accordingly, there may be a desire (e.g., by the administrator, the user, and/or the individual associated with the account) to secure the sensitive information and/or prevent exposure of the sensitive information (e.g., via a captured screenshot).

The sensitive information may be associated with an operation of the information management application. For example, the sensitive information may be associated with a feature of the information management application that uses the sensitive information (e.g., to identify the individual, identify a characteristic of the individual, authenticate the individual, among other examples) and/or that maintains the sensitive information in association with managing the account and/or other information associated with the individual.

As further shown in FIG. 1B, and by reference number 120, the user device identifies sensitive information (e.g., within the set of information). For example, the user device, via the information management application, may identify the sensitive information based on receiving the set of information, based on a session of the information management application being opened and/or active, based on a user accessing or interacting with the set of information, or the like.

Figure 1C:
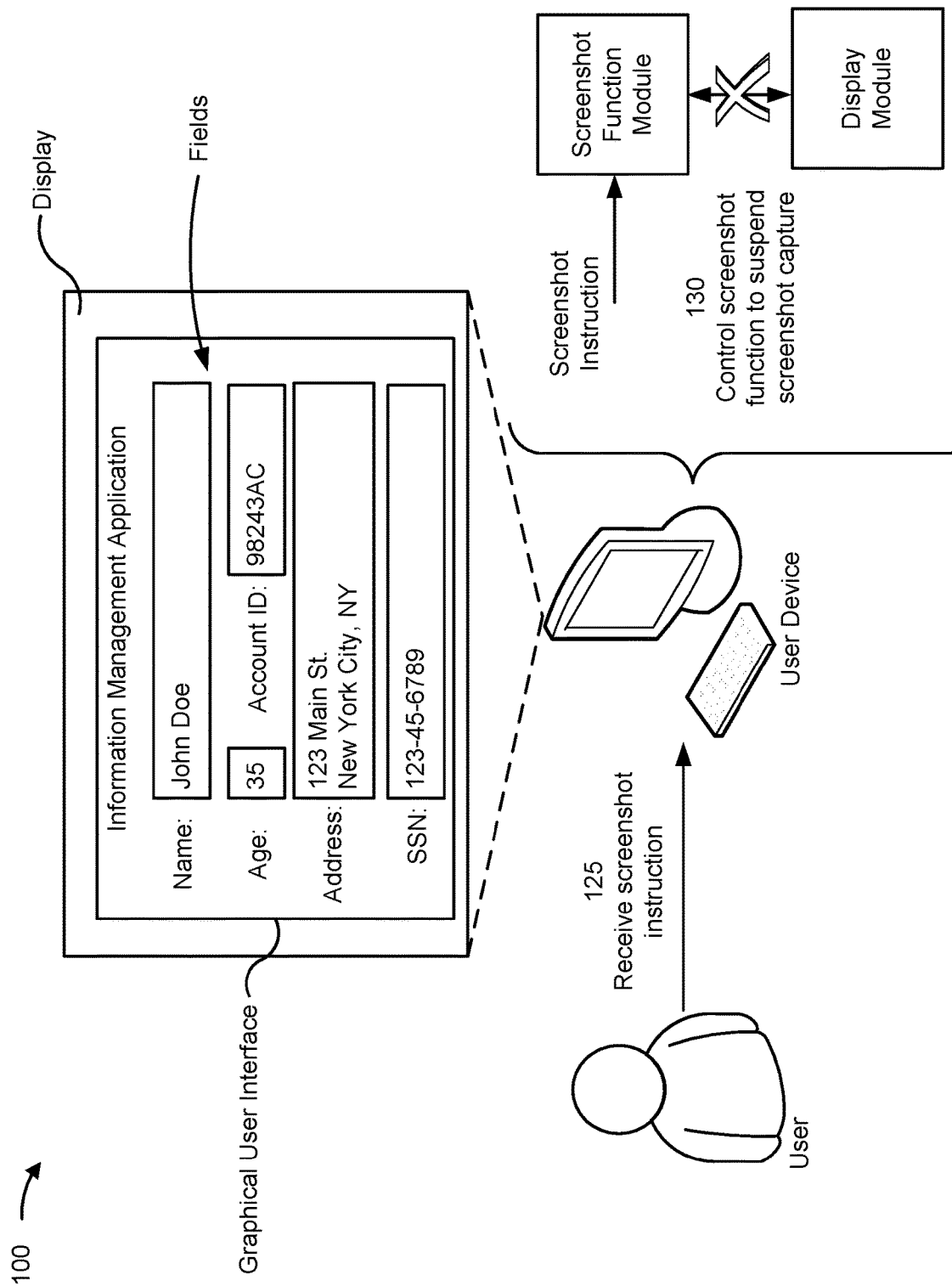

As shown in FIG. 1C, and by reference number 125, the user device receives a screenshot instruction. The user device may receive (and/or detect) the screenshot instruction based on monitoring the screenshot function module according to the authorization and/or accessing the screenshot function module based on receiving the authorization.

The screenshot instruction may be associated with capturing a screenshot of a display of the user device. The user device may receive the screenshot instruction via a user input. The user input may be received according to a user interacting with one or more input components of the user device. For example, the user input may be received via a user interaction (e.g., a touch or press) with a screenshot hotkey of a keyboard or a designated keystroke of certain keys on the keyboard. Such a user input may be received intentionally (e.g., because the user intended to obtain the screenshot) or unintentionally (e.g., because the user accidentally interacts with a hotkey that triggers the screenshot instruction). In some implementations, the screenshot instruction may be received from another application installed on the user device. For example, the screenshot instruction may be received from a screenshot application, a screen recording application, and/or another type of application that is designated or capable of capturing a screenshot of a display of the user device.

As further shown in FIG. 1C, and by reference number 130, the user device controls the screenshot function to suspend screenshot capture. For example, the user device may prevent the screenshot function module from capturing a screenshot by delaying timing associated with capturing the screenshot. The user device may suspend a capture of a screenshot of a display of the user device for a time period. The time period may be a fixed time period (e.g., 10 milliseconds (ms), 20 ms, 50 ms, and so on). The duration of the fixed time period may be fixed such that a delay between a user submitting a screenshot instruction via a user input and the screenshot being captured is imperceptible to the user.

Additionally, or alternatively, the time period may be based on certain characteristics of the display of the user device and/or a graphical user interface of the user interface. For example, because a length of time that may be required to mask sensitive information may depend on an amount of the sensitive information, the duration of the time period may be based on the amount of sensitive information that is being presented on the display of the user device and/or the graphical user interface of the information management application. Accordingly, the size of content (e.g., a size of an image or text that needs to be masked) in a portion of the graphical user interface of the information management application may determine the duration of the time period. Correspondingly, the size of a portion of the display and/or the graphical user interface that includes the sensitive information may determine the duration of the time period. In this way, the user device and/or information management application may suspend the capture of the screenshot for a longer period of time when the graphical user interface and/or the display include more sensitive information than when the graphical user interface and/or display includes less sensitive information. In some implementations, the duration of the time period may be based on the length of time that is required to mask any identified sensitive information that is presented via the display and/or the graphical user interface.

Additionally, or alternatively, the user device, via the information management application, may prevent the screenshot function module from capturing the screenshot by intercepting the screenshot instruction. In such a case, the information management application may hold the screenshot instruction until sensitive information on the display and/or within the graphical user interface is masked, as described elsewhere herein. In this way, the user device and/or information management application may control the duration of a time period to suspend capture of the screenshot by the screenshot function module.

In this way, the user device and/or the information management application may control the screenshot function module.

Figure 1D:
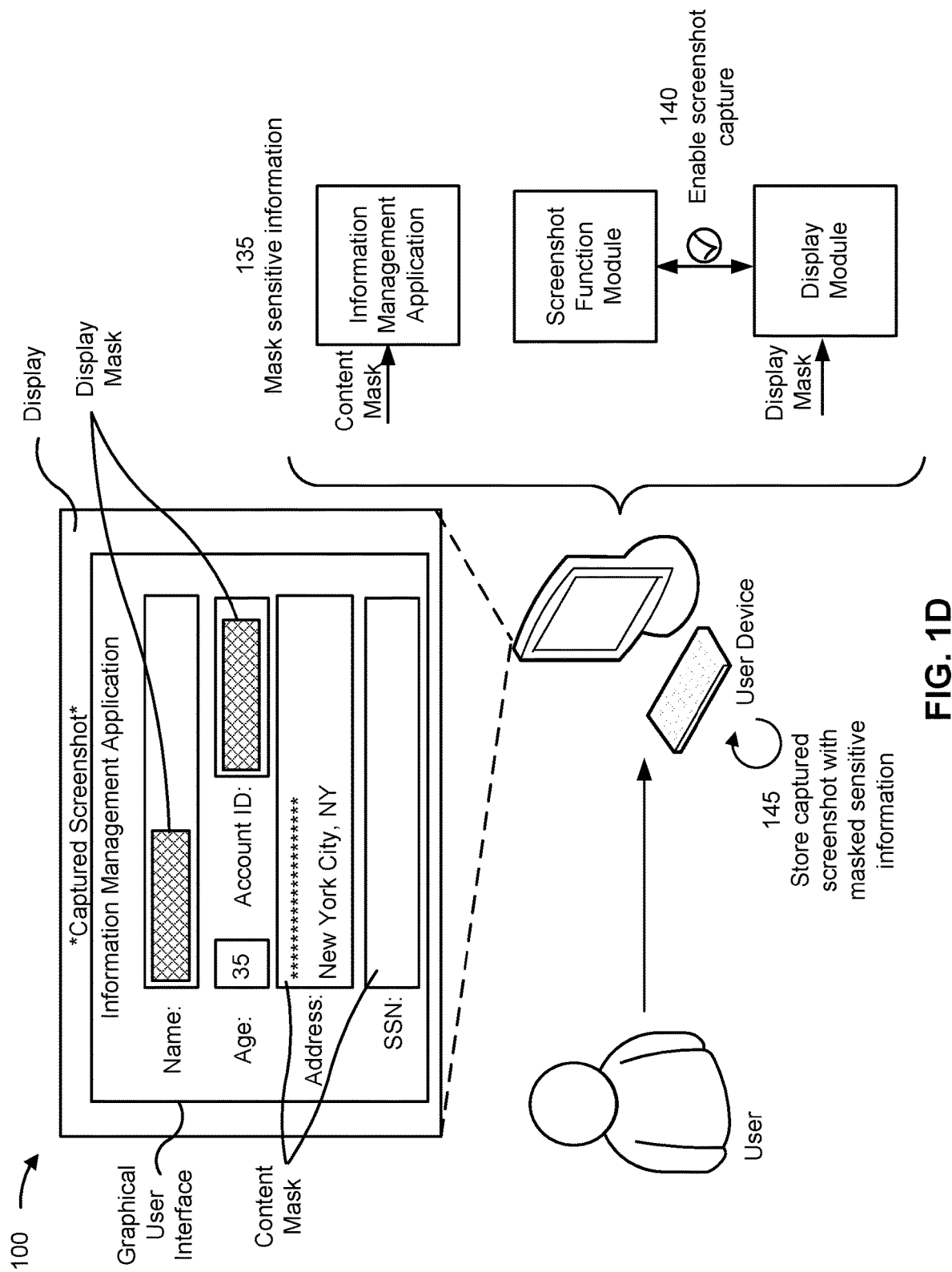

As shown in FIG. 1D, and by reference number 135, the user device masks the sensitive information. The user device may identify the sensitive based on the information management application including or displaying one or more fields that are associated with sensitive information. For example, based on the information management application being configured to store, maintain, and/or present sensitive information via the graphical user interface of the information management application and/or via the display of the user device, one or more fields or types of information may be designated as being associated with or including sensitive information. Accordingly, to mask the sensitive information, the user device and/or the information management application may be configured to identify which fields of the information management application include sensitive information and which fields (or other portions of the graphical user interface) are not associated with or do not include sensitive information.

The user device may mask the sensitive information by masking a portion of the graphical user interface that includes the sensitive information. The portion of the graphical user interface may be identified and/or determined based on the portion (and/or fields of the graphical user interface being populated with content that is associated with sensitive information) being actively displayed on the display of the user device (e.g., to permit the user to view the sensitive information).

To mask the portion of the graphical user interface, the user device and/or the information management application may alter pixel values of the portion of the graphical user interface. Additionally, or alternatively, the user device (and/or the information management application) may overlay, on the display, a masking image over the portion of the graphical user interface (as shown in the "Name" field and/or "Account ID" field). The masking image may include any suitable means to redact and/or obfuscate the sensitive information in the fields that include the sensitive information. Additionally, or alternatively, to mask the portion of the graphical user interface, the user device (and/or the information management application) may remove the content from the field or alter a value of the content in the field (as shown in the "Address" field).

In this way, the user device may mask the sensitive information associated with the information management application prior to a screenshot being captured to prevent the screenshot from including the sensitive information.

As further shown in FIG. 1D, and by reference number 140, the user device enables the screenshot capture. For example, after the sensitive information has been masked (and/or after a duration of a time period to suspend capture of the screenshot), the user device may permit the screenshot function module to capture the screenshot in accordance with the screenshot instruction. In some implementations, the user device and/or the information management application may verify that the sensitive information has been masked prior to enabling the screenshot function module to capture the screenshot (e.g., by verifying that the fields that are designated as associated with sensitive information are masked as described herein).

In this way, the screenshot function of the user device may be prevented from capturing the screenshot until content that includes sensitive information is masked.

As further shown in FIG. 1D, and by reference number 145, the user device stores the captured screenshot with masked sensitive information. For example, the user device, via the screenshot function module, may store the screenshot in a memory or data structure according to any suitable techniques. The stored screenshot, as described herein, may include one or more masked portions (e.g., portions of the graphical user interface or the display that include sensitive content) and one or more non-masked portions (e.g., portions of the graphical user interface or the display that do not include sensitive information).

Figure 1E:
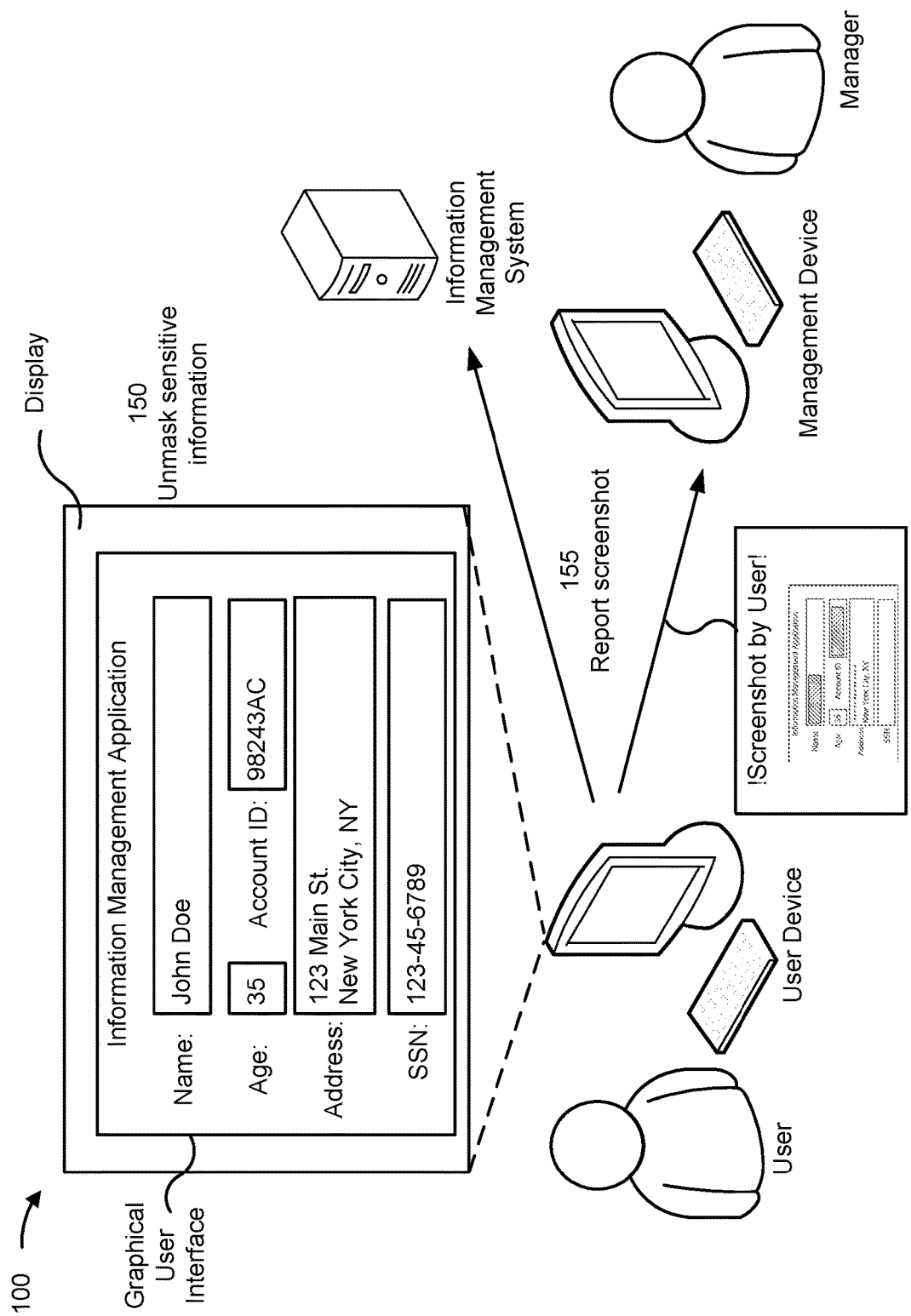

As shown in FIG. 1E, and by reference number 150, the user device unmasks the sensitive information. For example, after the screenshot is captured and/or stored, the user device and/or the information management application may remove the masked portions of the display and/or return the altered values of the content to the original values of the content to permit the sensitive information to be presented via the display and/or the graphical user interface.

Accordingly, after the screenshot function captures the screenshot, the user device and/or the information management application may unmask the content in fields that are associated with and/or include sensitive information.

As further shown in FIG. 1E, and by reference number 155, the user device reports the screenshot. For example, the user device and/or the information management application, based on detecting that a screenshot was captured while sensitive information was being presented on the display or via the graphical user interface of the information management application, may send or provide a notification to the management device and/or the information management system to indicate that a screenshot was captured. The notification may include the captured screenshot to permit the information management system and/or the manager to verify that the sensitive information was masked.

In this way, the user device and/or the information management application may perform an action associated with enabling the screenshot to be sent or stored, thereby enabling the user and/or the manager to access the screenshot and/or information from the screenshot.

Accordingly, as described herein, the user device and/or the information management application enable a screenshot of non-sensitive information to be captured from a display and/or a graphical user interface that includes or is presenting sensitive information. In this way, the user device and/or the information management application may enable use of non-sensitive information within a screenshot while protecting or preventing exposure of sensitive information within a screenshot of a display that is presenting both the sensitive and non-sensitive information.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
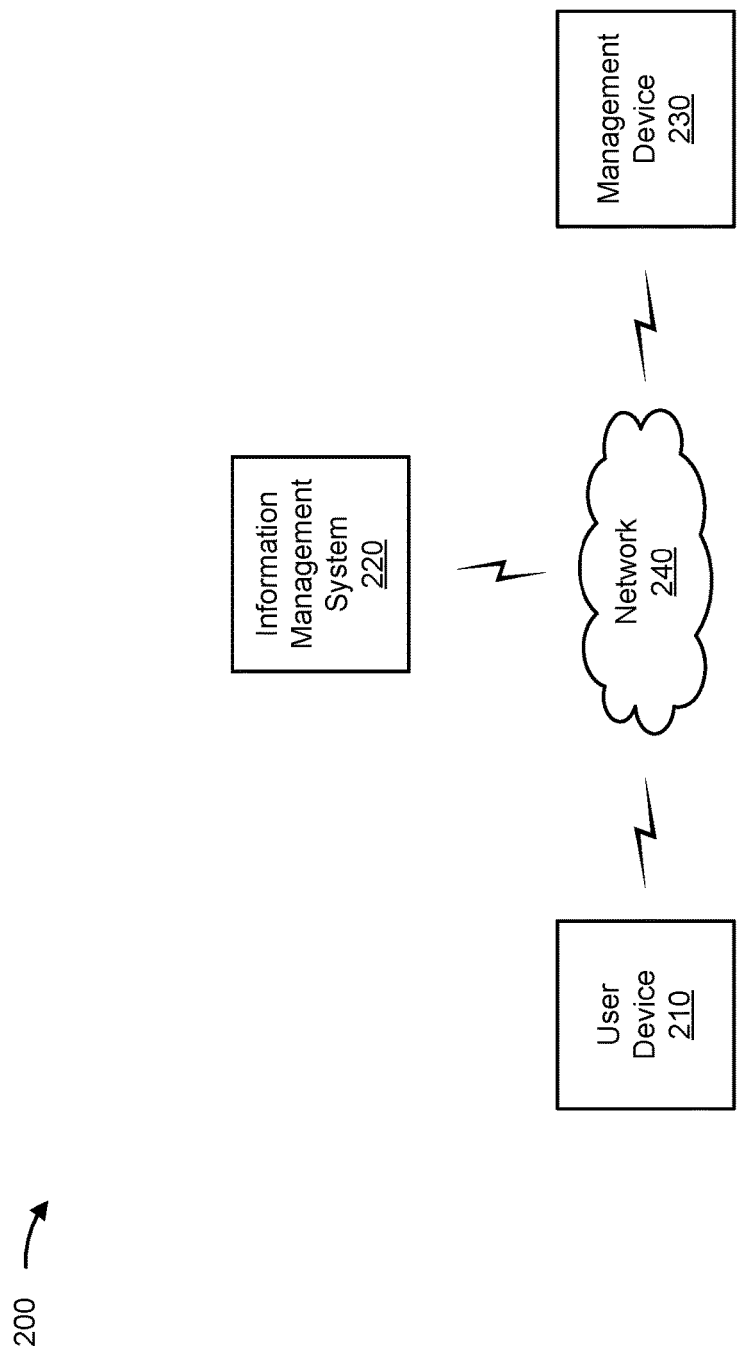
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an information management system 220, a management device 230, and a network 240. Devices of environment 200 may interconnect via wired connections, wireless connections, or a combination of wired and wireless connections.

The user device 210 includes one or more devices capable of receiving, generating, storing, processing, and/or providing information associated with controlling a screenshot function to obfuscate sensitive information in a screenshot, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The information management system 220 includes one or more devices capable of receiving, generating, storing, processing, providing, and/or routing information associated with managing information associated with an individual and/or an account of the customer, as described elsewhere herein. The information management system 220 may include a communication device and/or a computing device. For example, the information management system 220 may include a server, such as an application server, a client server, a web server, a database server, a host server, a proxy server, a virtual server (e.g., executing on computing hardware), or a server in a cloud computing system. In some implementations, the information management system 220 includes computing hardware used in a cloud computing environment.

The management device 230 includes one or more devices capable of receiving, generating, storing, processing, providing, and/or routing information associated with managing a screenshot captured by the user device 210, as described elsewhere herein. The management device 230 may include a communication device and/or a computing device. For example, the management device 230 may include a wireless communication device, a mobile phone, a user equipment, a laptop computer, a tablet computer, a desktop computer, or a similar type of device.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
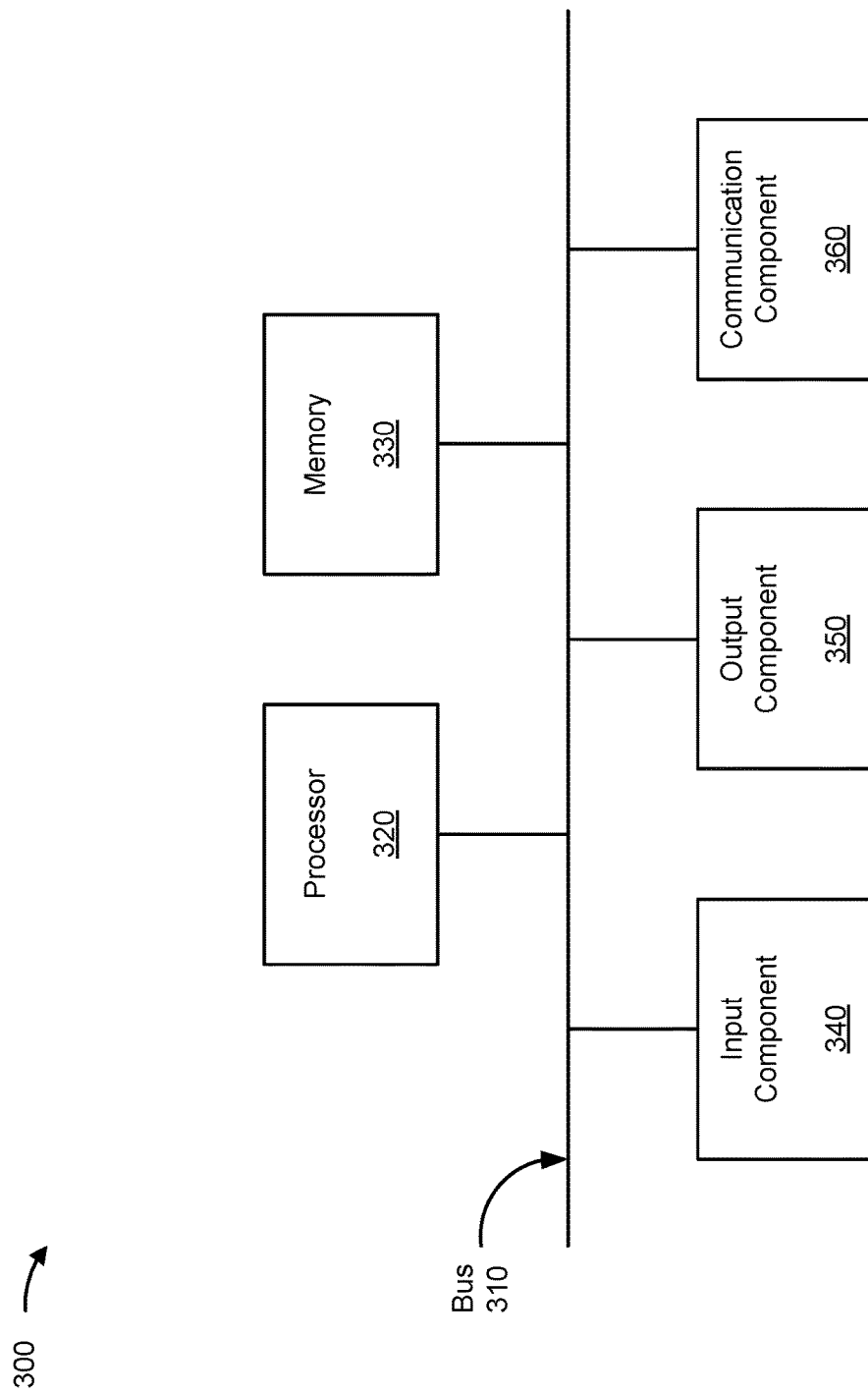
FIG. 3 is a diagram of example components of one or more devices of FIG. 2.

FIG. 3 is a diagram of example components of a device 300, which may correspond to the user device 210, the information management system 220, and/or the management device 230. In some implementations, the user device 210, the information management system 220, and/or the management device 230 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
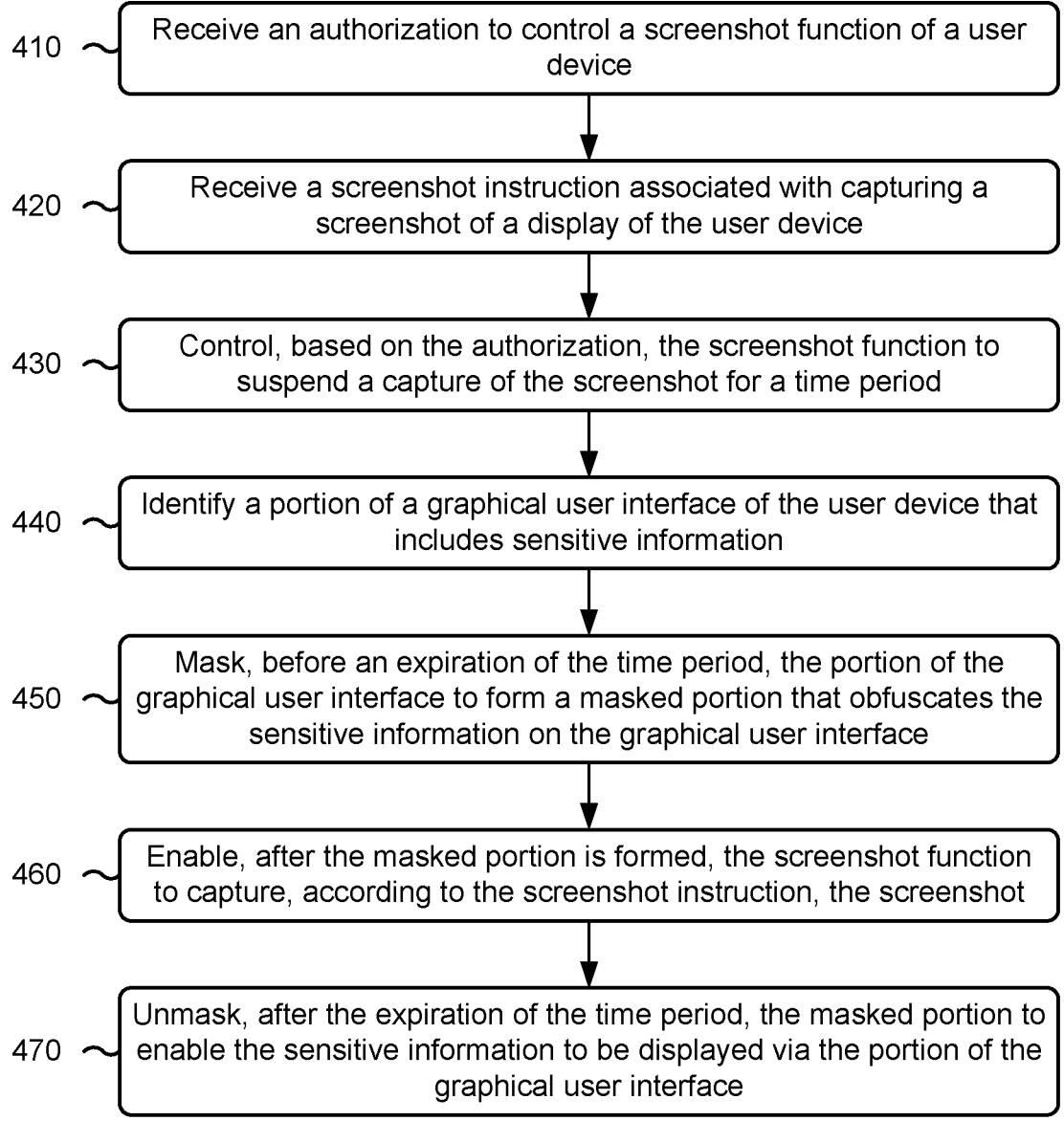
FIG. 4 is a flowchart of an example process associated with controlling a screenshot function to obfuscate sensitive information in a screenshot.

FIG. 4 is a flowchart of an example process 400 associated with controlling a screenshot function to obfuscate sensitive information in a screenshot. In some implementations, one or more process blocks of FIG. 4 may be performed by a user device (e.g., user device 210). In some implementations, one or more process blocks of FIG. 4 may be performed by another device or a group of devices separate from or including the user device, such as the management device 230. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an authorization to control a screenshot function of a user device (block 410). As further shown in FIG. 4, process 400 may include receiving a screenshot instruction associated with capturing a screenshot of a display of the user device (block 420). As further shown in FIG. 4, process 400 may include controlling, based on the authorization, the screenshot function to suspend a capture of the screenshot for a time period (block 430). As further shown in FIG. 4, process 400 may include identifying a portion of a graphical user interface of the user device that includes sensitive information (block 440). As further shown in FIG. 4, process 400 may include masking, before an expiration of the time period, the portion of the graphical user interface to form a masked portion that obfuscates the sensitive information on the graphical user interface (block 450). As further shown in FIG. 4, process 400 may include enabling, after the masked portion is formed, the screenshot function to capture, according to the screenshot instruction, the screenshot (block 460). As further shown in FIG. 4, process 400 may include unmasking, after the expiration of the time period, the masked portion to enable the sensitive information to be displayed via the portion of the graphical user interface (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions, the set of instructions comprising:
one or more instructions that, when executed by one or more processors of a user device, cause the user device to:
receive an authorization to control a screenshot function of the user device;
receive content within a field of a graphical user interface of an application,
wherein the field is associated with sensitive information;
receive a screenshot instruction associated with capturing a screenshot of a display of the user device;
prevent, based on the field being designated as being associated with the sensitive information, a screenshot function of the user device from capturing the screenshot for a time period, wherein a duration of the time period is based on: an amount of the sensitive information that is being presented on the graphical user interface, and a set of characteristics of the display;
determine that the content is masked based on a determination that a value of the content has been altered;
enable the screenshot function to capture, according to the screenshot instruction, the screenshot with the content being masked on the display; and
unmask, after an expiration of the time period, the content to enable the sensitive information to be displayed.

2. The non-transitory computer-readable medium of claim 1, wherein the screenshot function is controlled by a screenshot application of the user device that is different from the application associated with the graphical user interface,
wherein the authorization is received based on a user authorization that authorizes access to the screenshot application.

3. The non-transitory computer-readable medium of claim 1, wherein the one or more instructions further cause the user device to:
remove at least a portion of the content from the field to mask the content,
wherein determining that the content is masked comprises determining that at least the portion the content has been removed.

4. The non-transitory computer-readable medium of claim 1, wherein the one or more instructions further cause the user device to:
alter the value of the content to mask the content,
wherein determining that the content is masked comprises determining that the value of the content has been altered before the expiration of the time period.

5. The non-transitory computer-readable medium of claim 1, wherein the screenshot function of the user device is prevented from capturing the screenshot until the content is masked based on the content being actively displayed on the display of the user device when the screenshot instruction is received.

6. The non-transitory computer-readable medium of claim 1, wherein the duration of the time period is further based on a size of the content.

7. The non-transitory computer-readable medium of claim 1, wherein the time period is further based on a set of characteristics of the graphical user interface.

8. A method for obfuscating sensitive information, comprising:
receiving an authorization to control a screenshot function of a user device;
receiving content within a field of a graphical user interface,
wherein the field is associated with sensitive information;
receiving a screenshot instruction associated with capturing a screenshot of a display of the user device;
preventing, based on the field being designated as being associated with the sensitive information, a screenshot function of the user device from capturing the screenshot for a time period, wherein a duration of the time period is based on an amount of the sensitive information that is being presented on the graphical user interface;
enabling the screenshot function to capture, according to the screenshot instruction, the screenshot based at least in part on determining that the content is masked; and
unmasking, after an expiration of the time period, the content to enable the sensitive information to be displayed.

9. The method of claim 8, wherein the graphical user interface is associated with an application and the screenshot function is controlled by a screenshot application of the user device that is different from the application,
wherein the authorization is received based on a user authorization that authorizes access to the screenshot application.

10. The method of claim 8, further comprising:
removing the content from the field to mask the content,
wherein determining that the content is masked comprises determining that the content has been removed.

11. The method of claim 8, further comprising:
altering a value of the content to mask the content,
wherein determining that the content is masked comprises determining that the value of the content has been altered before expiration of the time period.

12. The method of claim 8, wherein the screenshot function of the user device is prevented from capturing the screenshot until the content is masked based on the content being actively displayed on the display of the user device when the screenshot instruction is received.

13. A system for obfuscating sensitive information, the system comprising:
one or more memories; and
one or more processors, coupled to the one or more memories, configured to:
receive an authorization to control a screenshot function of a user device;
receive content within a field of a graphical user interface;
receive a screenshot instruction associated with capturing a screenshot of a display of the user device;
prevent, based on the field being designated as being associated with sensitive information, a screenshot function of the user device from capturing the screenshot for a time period, wherein a duration of the time period is based on an amount of the sensitive information that is being presented on the graphical user interface;
  enable the screenshot function to capture, according to the screenshot instruction, the screenshot based at least in part on determining that the content is masked; and
  unmask, after an expiration of the time period, the content to enable the sensitive information to be displayed.

14. The system of claim 13, wherein the graphical user interface is associated with an application and the screenshot function is controlled by a screenshot application of the user device that is different from the application,
  wherein the authorization is received based on a user authorization that authorizes access to the screenshot application.

15. The system of claim 13, wherein the one or more processors are further configured to:
  remove the content from the field to mask the content,
    wherein to determine that the content is masked, the one or more processors are configured to determine that the content has been removed.

16. The system of claim 13, wherein the one or more processors are further configured to:
  alter a value of the content to mask the content,
    wherein determining that the content is masked comprises determining that the value of the content has been altered.

17. The system of claim 13, wherein the screenshot function of the user device is prevented from capturing the screenshot until the content is masked based on the content being actively displayed on the display of the user device when the screenshot instruction is received.

18. The system of claim 13, wherein the one or more processors are further configured to:
  perform an action associated with enabling the screenshot to be sent or stored,
  wherein the screenshot includes a masked portion and a non-masked portion of the graphical user interface that is not associated with the sensitive information.

19. The system of claim 13, wherein the one or more processors are further configured to:
  alter, before the expiration of the time period, one or more pixel values of a portion of the graphical user interface to mask the content, and wherein the portion of the graphical user interface is identified based on the field being populated.

20. The system of claim 13, wherein the time period is further based on a set of characteristics of the graphical user interface.

* * * * *